(12) United States Patent
Lorenzini et al.

(10) Patent No.: US 10,878,232 B2
(45) Date of Patent: Dec. 29, 2020

(54) AUTOMATED PROCESSING OF RECEIPTS AND INVOICES

(71) Applicant: BlinkReceipt, LLC, Brooklyn, NY (US)

(72) Inventors: Court V Lorenzini, Mercer Island, WA (US); Samuel Anthony Lucente, II, San Francisco, CA (US); Roy Penn, Seattle, WA (US)

(73) Assignee: BlinkReceipt, LLC, Brooklyn, NY (US)

(*) Notice: Subject to any disclaimer, the term of this patent is extended or adjusted under 35 U.S.C. 154(b) by 0 days.

(21) Appl. No.: 15/238,620

(22) Filed: Aug. 16, 2016

(65) Prior Publication Data

US 2018/0053045 A1   Feb. 22, 2018

(51) Int. Cl.
*G06Q 20/20* (2012.01)
*G06K 9/00* (2006.01)
*G06Q 20/04* (2012.01)

(52) U.S. Cl.
CPC ....... *G06K 9/00442* (2013.01); *G06Q 20/047* (2020.05); *G06Q 20/209* (2013.01); *G06K 2209/01* (2013.01)

(58) Field of Classification Search
CPC combination set(s) only.
See application file for complete search history.

(56) References Cited

U.S. PATENT DOCUMENTS

| | | | |
|---|---|---|---|
| 7,158,948 B1 | 1/2007 | Rodriguez et al. | |
| 7,428,988 B1 | 9/2008 | Starr | |
| 7,780,081 B1 | 8/2010 | Liang | |
| 8,219,558 B1 | 7/2012 | Trandal et al. | |
| 8,805,125 B1* | 8/2014 | Kumar | G06K 9/00469 382/309 |
| 9,922,375 B1* | 3/2018 | Neveu | G06Q 40/12 |
| 2002/0165872 A1 | 11/2002 | Meltzer et al. | |
| 2003/0142855 A1* | 7/2003 | Kuo | G06K 9/00154 382/119 |
| 2004/0083134 A1* | 4/2004 | Spero | G06Q 40/12 705/16 |
| 2004/0098664 A1* | 5/2004 | Adelman | H04N 1/00244 715/201 |
| 2004/0193538 A1 | 9/2004 | Raines | |

(Continued)

*Primary Examiner* — Tsung Yin Tsai
(74) *Attorney, Agent, or Firm* — Athorus, PLLC

(57) ABSTRACT

Systems and methods for automatic processing of receipts to capture data from the receipts are presented. Upon receiving an image of a receipt, an optical character recognition (OCR) of the receipt content embodied in the image is executed. The OCR of the receipt content results in machine-encoded text content of the receipt content embodied in the image. Tokens are generated from the machine-encoded text content and data groups are constructed according to horizontal lines of generated tokens. Potential product items are identified for at least some of the constructed data groups and the potential product items are evaluated for the at least some constructed data groups. The evaluation of the potential product items for the at least some constructed data groups identifies receipt data, such as product items and vendor information, associated with the least some constructed data groups. The identified receipt data is captured and stored with the image of the receipt in a data store.

20 Claims, 6 Drawing Sheets

(56) References Cited

U.S. PATENT DOCUMENTS

| | | | |
|---|---|---|---|
| 2006/0262910 A1* | 11/2006 | Molnar | G06K 9/726 379/88.17 |
| 2008/0219543 A1* | 9/2008 | Csulits | G07D 7/00 382/135 |
| 2008/0288509 A1 | 11/2008 | Mysen et al. | |
| 2008/0313165 A1 | 12/2008 | Wu et al. | |
| 2009/0006151 A1 | 1/2009 | Zarghami et al. | |
| 2009/0110287 A1 | 4/2009 | Bates et al. | |
| 2010/0017314 A1* | 1/2010 | Johnson | G06Q 10/10 705/30 |
| 2010/0054605 A1 | 3/2010 | Molnar et al. | |
| 2010/0082454 A1 | 4/2010 | Narayanaswami et al. | |
| 2010/0217678 A1 | 8/2010 | Goncalves | |
| 2010/0306080 A1* | 12/2010 | Trandal | G06Q 10/10 705/26.8 |
| 2011/0052075 A1* | 3/2011 | Comay | G06K 9/00442 382/190 |
| 2011/0313917 A1* | 12/2011 | Lawson | G06Q 30/0207 705/40 |
| 2012/0185368 A1* | 7/2012 | Schloter | G06Q 40/12 705/30 |
| 2012/0189186 A1* | 7/2012 | Csulits | G07F 19/207 382/135 |
| 2013/0009774 A1 | 1/2013 | Sabeta | |
| 2013/0201307 A1* | 8/2013 | Schloter | H04N 5/23229 348/61 |
| 2013/0204754 A1 | 8/2013 | Brelig et al. | |
| 2014/0003727 A1 | 1/2014 | Lortz et al. | |
| 2014/0006198 A1 | 1/2014 | Daly et al. | |
| 2014/0064618 A1* | 3/2014 | Janssen, Jr. | G06K 9/00469 382/182 |
| 2014/0095985 A1 | 4/2014 | Argue et al. | |
| 2014/0249947 A1 | 9/2014 | Hicks et al. | |
| 2015/0153982 A1 | 6/2015 | Berarducci et al. | |
| 2015/0161704 A1 | 6/2015 | Lempel | |
| 2015/0379887 A1 | 12/2015 | Becker et al. | |
| 2016/0180467 A1 | 6/2016 | Griffin et al. | |
| 2016/0371632 A1* | 12/2016 | Lorenzini | G06K 9/3258 |
| 2017/0083968 A9 | 3/2017 | Hicks et al. | |

* cited by examiner

AUTOMATED PROCESSING OF RECEIPTS AND INVOICES

BACKGROUND

Receiving a receipt as evidence of a sale of goods or provision of services is a ubiquitous part of our life. When you go to a grocery store and make a purchase of one or more items, you receive a receipt. When you purchase fuel for your car, you receive a receipt. Indeed, receipts permeate all aspects of transactions. Generally speaking, receipts evidence a record of a transaction. Receipts itemize the goods or services that were purchased, particularly itemizing what (goods and/or services) was purchased, the quantity of any given item that was purchased, the price of the item(s) purchased, taxes, special offers and/or discounts generally applied or for particular items, the date (and often the time) of the transaction, the location of the transaction, vendor information, sub-totals and totals, and the like.

There is no set form for receipts. Receipts may be printed on full sheets of paper, though many point of sale machines print receipts on relatively narrow slips of paper of varying lengths based, frequently, on the number of items (goods or services) that were purchased. While receipts itemize the items that were purchased, the itemizations are typically terse, cryptic and abbreviated. One reason for this is the limited amount of space that is available for descriptive content. Further, each vendor typically controls the descriptive "language" for any given item. Even different stores of the same vendor will utilize distinct descriptive language from that of other stores. As a consequence, while the purchaser will typically be able to decipher the itemized list of purchased items based on knowledge of what was purchased, a third party will not: the itemized list of purchased items does not lend itself to fully describing the purchases.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Systems and methods for automatic processing of receipts to capture data from the receipts are presented. Upon receiving an image of a receipt, an optical character recognition (OCR) of the receipt content embodied in the image is executed. The OCR of the receipt content results in machine-encoded text content of the receipt content embodied in the image. Tokens are generated from the machine-encoded text content and likely interpretations of the tokens are determined. At least some of the generated tokens are aggregated and potential items of content are identified. The potential items of content are stored with the image of the receipt in a data store.

According to additional aspects of the disclosed subject matter, a method for processing a receipt is presented. The method comprises receiving an image of a receipt and executing an optical character recognition (OCR) of the receipt content embodied in the image. In operation, the OCR of the receipt content results in machine-encoded text content. Tokens are generated from the machine-encoded text content. By way of definition, a token comprises one or more horizontally contiguous text characters that are displayable (non-whitespace characters). Contiguity is determined by white space: if two characters are separated by a white-space character (a white space intended to separate contiguous characters), the two characters are not contiguous. At least some of the generated tokens are aggregated and potential items of content are identified. The potential items of content are stored with the image of the receipt in a data store.

According to still further aspects of the disclosed subject matter, a computer device for processing a receipt is presented. The computing device includes a processor and a memory, wherein the processor executes instructions stored in the memory as part of or in conjunction with additional components to process the receipt. These additional components include a receipt processor. In operation, the receipt processor is configured to receive an image of a receipt and capture and store items of content of the receipt in a data store. Additionally, the computing device includes an Optical Character Recognition (OCR) component that, in execution, transcribes the receipt content embodied in the image of the receipt into machine-encoded text content. A token generator generates tokens from the machine-encoded text content from the OCR component and a data group generator constructs data groups according to horizontal lines of tokens of the receipt. A matching component then identifies potential items of content according to aggregated generated tokens or the data groups. The potential items of content are stored in a data store in association with the receipt image.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
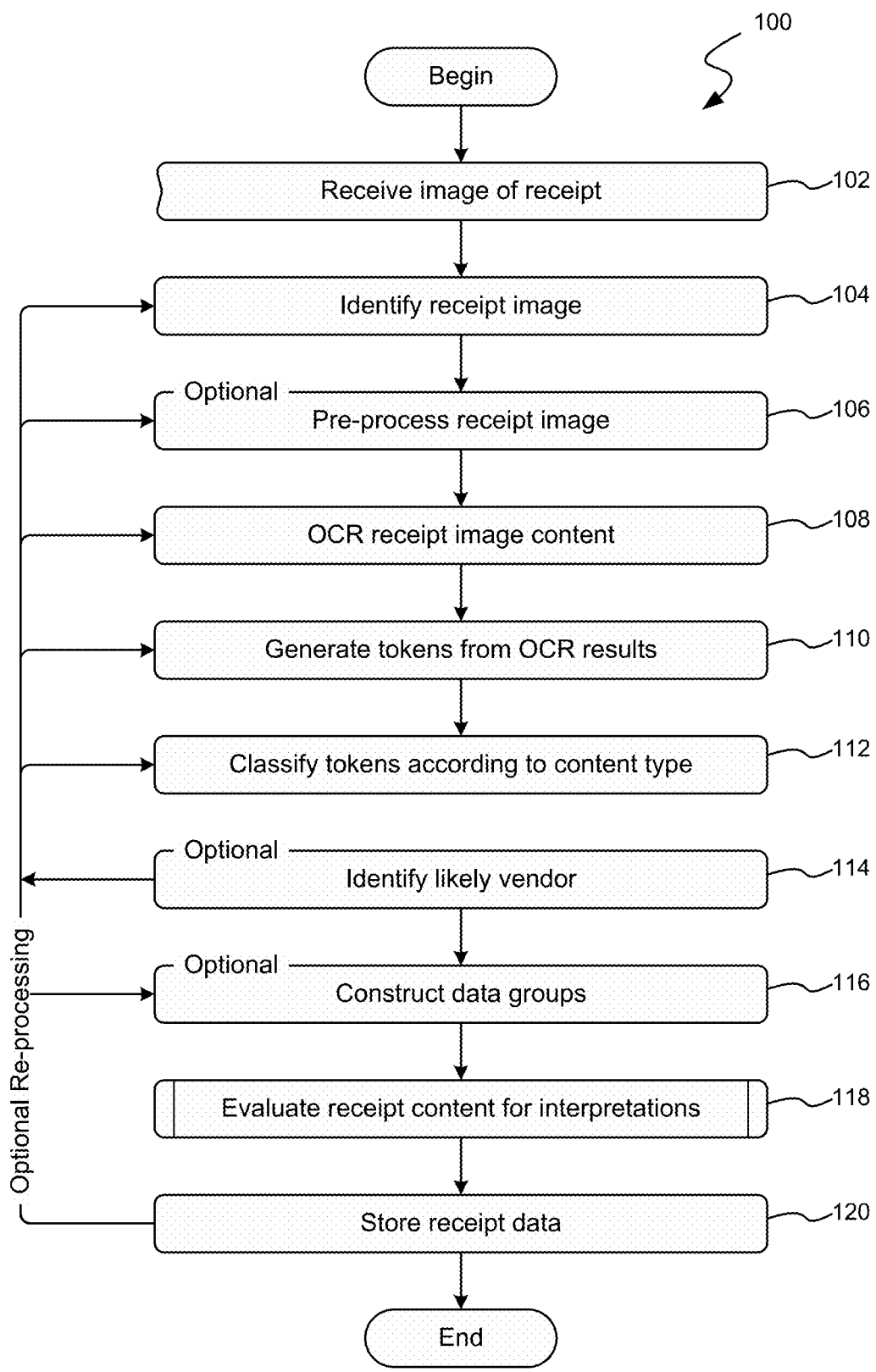
FIG. 1 represents a flow diagram illustrating an exemplary routine for processing an image of a receipt.

For purposes of clarity and definition, the term "exemplary," as used in this document, should be interpreted as serving as an illustration or example of something, and it should not be interpreted as an ideal or a leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users.

For purposed of clarity and definition, a "receipt" is a record or evidence of a transaction for goods and/or services that is provided to the purchaser. While many receipts are on a printed page, various aspects of the disclosed subject matter may be suitable applied to receipts that are transmitted electronically, such as images and/or text-based receipts.

The term "receipt image" should be interpreted as that portion of an image of a receipt that represents the subject matter of the receipt to be processed. For purposes of clarity and definition, a receipt image is differentiated from an "image of a receipt" in that an image of a receipt may include extraneous data. For example, a purchaser may take an image of a receipt, where the image includes the receipt, but may also include other subject matter that is not part of the receipt. As will be described in greater detail below, as part of the disclosed subject matter, one or more steps are taken to isolate the receipt image (a subsection of the image of the receipt) such that the receipt image includes only content found on the receipt.

The subsequent description is set forth in regard to processing receipts. While the disclosed subject matter is suitable for advantageously processing receipts, the same subject may be suitably applied to invoices. While a receipt often lists the particular items of purchase, an "invoice" is a document/record that more particularly itemizes a transaction between a purchaser and a seller/vendor. By way of illustration, an invoice will usually include the quantity of purchase, price of goods and/or services, date, parties involved, unique invoice number, tax information, and the like. Accordingly, while the description of the novel subject matter is generally made in regard to processing receipts, it is for simplicity in description and should not be construed as limiting upon the disclosed subject matter. Indeed, the same novel subject matter is similarly suited and applicable to processing invoices.

While aspects of the disclosed subject matter are presented in some order, and particularly in regard to the description of various aspects of processing receipt images to identify purchase data represented by the underlying receipts, it should be appreciated that the order is a reflection of the order of presentation in this document and should not be construed as a required order in which the described steps must be carried out.

As suggested above and according to aspects of the disclosed subject matter, systems and methods for processing receipt images to identify purchase data represented by the underlying receipts are presented. Upon receiving an image of a receipt, processing steps are carried out to identify the purchase information represented by the receipt. These processing steps include identifying subsection of the image, referred to as the receipt image, to which processing of data is restricted in order to optimize the identification of the underlying purchase information. At least some of these aspects are set forth in regard to FIG. 1 described below.

Figure 2:
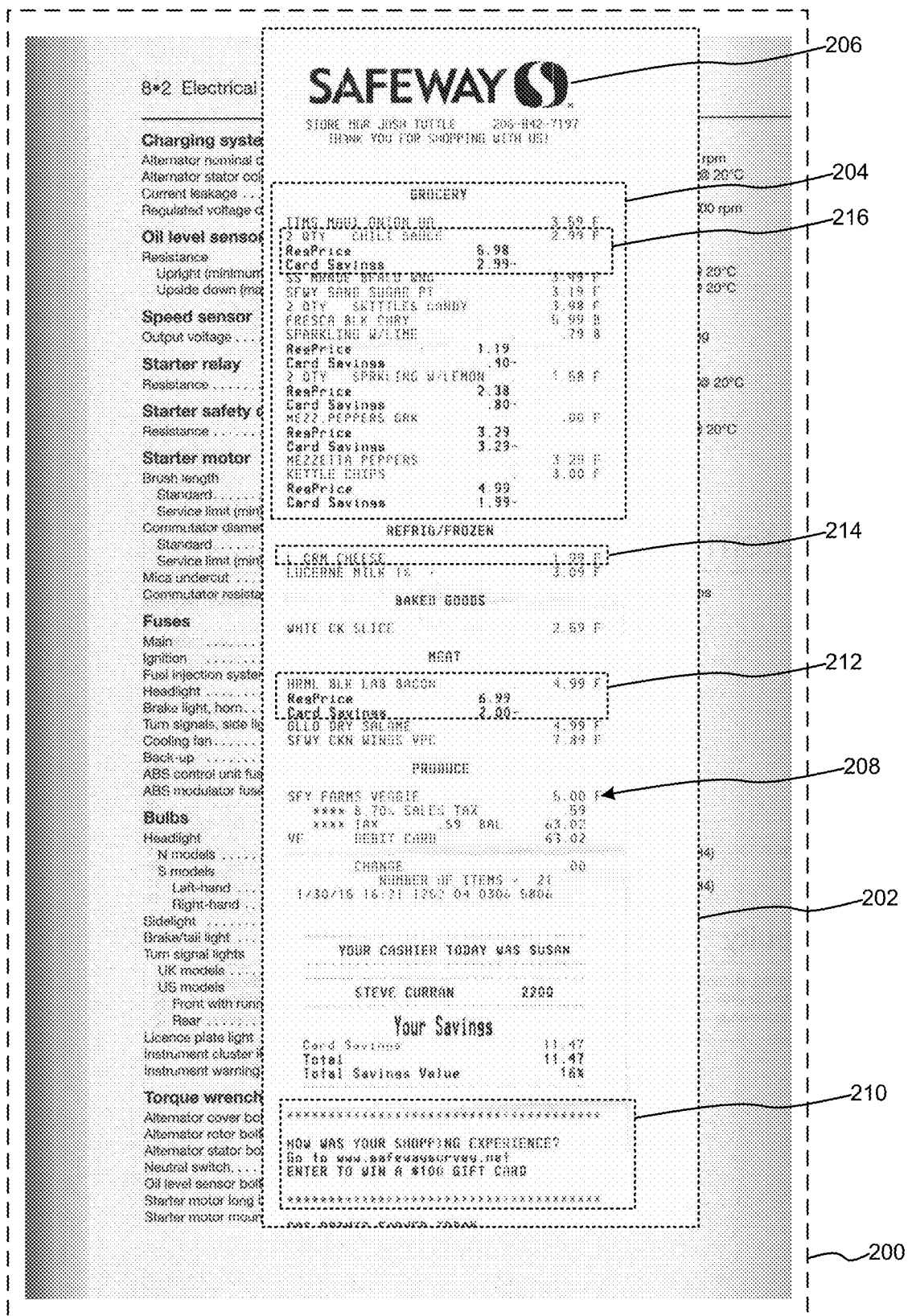
FIG. 2 is a pictorial diagram illustrating an exemplary image that includes a receipt that may be received or obtained for processing by the exemplary routine of FIG. 1.

Turning to FIG. 1, this figure represents a flow diagram illustrating an exemplary routine 100, as may be implemented by a suitably configured computing device or other online service, for processing an image of a receipt. Beginning at block 102, an image of a receipt is received or obtained. By way of illustration and example, FIG. 2 is a pictorial diagram illustrating an exemplary image of a receipt 200 that includes the content of a receipt that may be received or obtained for processing by the exemplary routine 100 of FIG. 1.

As suggested above, the image of a receipt may include other items or content that are not necessarily part of the receipt itself. For example, the receipt depicted in FIG. 2 was used as a bookmark and the image of the receipt 200 was taken by a camera without removing the receipt from the book, and without cropping out the "extra" information that comprises the content of the book. In light of this, at block 104, the exemplary routine 100 identifies the receipt image 202 of the received image 200. As indicated above, a receipt image 202 corresponds to that portion of a received image that represents the subject matter or content of a receipt to be processed. By way of illustration, receipt image 202 is a sub-image of image 200 and corresponds to the receipt content to be processed. According to aspects of the disclosed subject matter, the receipt image 202 of a received image may be determined according to various heuristics and rules, generally referred to as image filters. These image filters include, by way of illustration and not limitation: edge and/or border detection within the received image (e.g., straight lines corresponding to edges of paper may be captured in the received image); color differentials (e.g., the page color of the book is darker in shade while the paper color of the receipt image 202 is lighter); structural arrangement of content within an area of the received image (e.g., arrangements of 2 or 3 columns of data, especially in close proximity to each other, may indicate receipt data and therefore, the receipt image 202); anticipated paper sizes; and the like. Moreover, in identifying the receipt image 202, changes may be made to color interpretation within the image, determination and/or change of the orientation of the image, white balance, contrast, zoom levels, and the like.

After having identified the receipt image 202, at block 106 optional pre-processing of the receipt image is conducted. In pre-processing the receipt image, the routine 100 examines various aspects of the receipt and may take various corresponding actions in order to place the receipt in an optimal condition for further processing, e.g., for conducting optical character recognition on the content of the receipt. By way of illustration and not limitation, pre-processing of the receipt image may include edge and/or border detection within the received image (e.g., straight lines corresponding to edges of paper may be captured in the received image); color differentials (e.g., the page color of the book is darker in shade while the paper color of the receipt image 202 is lighter); blur detection and correction, document rotation and alignment, brightness and contrast of the content, and the like. Detection of these, and other, aspects of the receipt may cause the pre-processing step to also carry out one or more corresponding actions, such as modifying brightness and/or contrast of the image, rotating the image such that lines of content are aligned with the horizontal alignment of processing, and the like.

At block 108, an optical character recognition (OCR) filter/process is applied to the content of the receipt image. As is well known, an OCR process or filter converts textual content embodied in an image into corresponding machine encoded textual content. Moreover, in addition to translating the image content into machine encoded textual content and according to aspects of the disclosed subject matter, the location (i.e., the image area within the receipt image 202) of each character converted in the OCR process is also captured and stored in conjunction with the machine encoded textual character. For example, when converting to machine encoded textual content, the area corresponding to the letter "F" 210 is captured and retained with the machine encoded "F".

At block 110, tokens are generated from the results of the OCR process. By way of definition, a token corresponds to one or more contiguous text characters. Text characters comprise displayable characters (non-white space characters) that have a corresponding machine encoded character. Text characters include, by way of illustration and not limitation, numeric characters, alphabetic characters, symbols, and the like. While so-called white space characters (e.g., spaces, tabs, returns, gutters, and the like) are arguably "displayable" as they take up space within a receipt, for purposes of the disclosed subject matter they are considered to be non-displayable content. Contiguity is determined by white space and determined horizontally: if two text characters are separated by one or more white-space characters (white space generally utilized and intended to separate contiguous characters), the two characters are not contiguous. For example, the various characters in box 214 yield the following terms: "L" "CRM" "CHEESE" "1.99" and "F". Characters that may be viewed or perceived as contiguous vertically are not considered contiguous for purposes of generating tokens. Additionally and according to aspects of the disclosed subject matter, tokens may be identified and filtered according to know information regarding the receipt. By way of illustration and not limitation, knowledge the language utilized in the receipt, and/or the vendor issuing the receipt may be utilized to more accurately identify tokens.

At block 112, in addition to simply generating tokens from the results of the OCR process, once generated the tokens are also classified as to what the subject matter of the token likely represents. By way of illustration and not limitation, a token may be classified as any one of a plurality of token classes including, by way of illustration only, price, descriptive content, product data, address data or some portion of an address, zip code, phone number, quantity, store code, and the like. Of course, classifying the token as "unknown token" is also a possibility as it may not always be possible to determine the type/class of content for any given token.

At block 114, information regarding the vendor is optionally identified (in circumstances in which such information has not already been identified.) As suggested above, knowing the vendor that issued the receipt may be highly useful in identifying and classifying tokens as well as understanding the grouping of multi-lined entries, comments, and the like. A vendor may be identified according to interpreted tokens (viewed as keywords), the organization and/or arrangement of content in the receipt image, and the like. Additionally, while the identification of the vendor is recited in FIG. 1 as having occurred after the tokens are generated, or even after an OCR process is conducted, it should be appreciated that this is illustrative only and should not be viewed as limiting upon the disclosed subject matter. Indeed, the particular order of many of the steps of this exemplary routine 100 is illustrative and not mandatory, where the steps be re-arranged and/or re-ordered without departing from the intent of the claimed subject matter.

At block 116, data groups are optionally constructed from the content of the receipt image 202. Data groups are defined as groups of tokens that are viewed as collectively forming a discrete set of content. By way of illustration and not limitation, constructing data groups comprises aggregating tokens and characters horizontally that, according to analysis, appear to be a horizontally arranged set of content. Data groups may correspond to one or more specific item(s) of purchase. While most purchased items will occupy at least one line, there are often cases in which a data group may span multiple lines. Thus, in any given receipt the description of a purchased item or service may extend over multiple lines and are optionally aggregated into a single data group. For example, a purchased item as identified in box 212 corresponds to the purchase of a package of Hormel Black Label Bacon and the content relating to the one purchased item spans multiple lines. Similarly, the data group of box 216 corresponds to the purchase of two containers of Chili Sauce, also spanning multiple lines. In contrast, the data group of box 214 corresponds the purchase of one package of Cream Cheese and is entirely described on a single horizontal line.

Additionally, data groups are not necessarily directed to product items. For example, the content in box 210 may be viewed as a single data group of the receipt content. Accordingly, in various aspects of the disclosed subject matter, a data group may comprise multiple horizontal lines of content of the receipt image 202. As can be seen, often (but not exclusively) additional lines describe various pricing conditions (e.g., regular and/or sale prices), quantities, and the like. Moreover, often though not exclusively, the additional lines of a data group are distinguished according to descriptive subject matter of the purchased item as well as content arrangement (centered text, differing number of columns, pricing information located outside of typical location, typeface, and the like.) While determining data groups may be useful in processing the receipt content, constructing data groups from multiple lines of content is viewed as being an optional step to the process.

At block 118, based on the tokens in the data groups or, the generated tokens if no data groups are generated, and in consideration of any descriptive text, quantities, weights, prices, etc., as well as the identified or potentially identified vendor, one or more product items are evaluated for their interpretations as to the various items that they represent. Evaluating the content of the receipt image, as represented by data groups and/or tokens, is set forth below in regard to FIG. 3.

Figure 3:
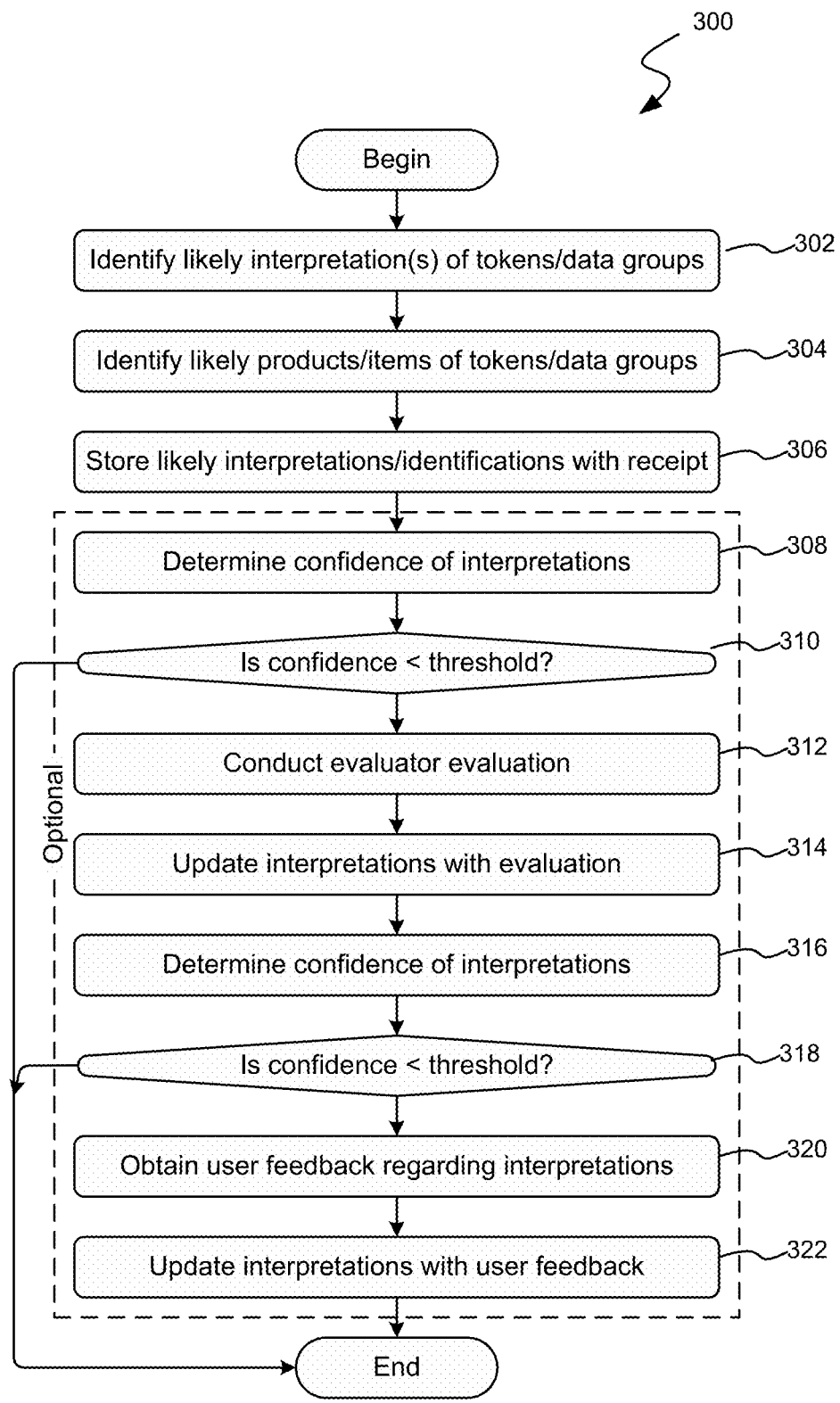
FIG. 3 is a flow diagram illustrating an exemplary routine for evaluating receipt content for interpretations.

FIG. 3 is a flow diagram illustrating an exemplary routine 300 for evaluating receipt content for interpretations. Beginning at block 302, the various interpretations of the tokens of a data group (or a horizontal aggregation of tokens) are combined in various ways, with consideration given to likely interpretations of the tokens, to generate a likely identification of the data group/aggregated tokens. By way of illustration and not limitation, the interpretations are made according to lexical analysis comparisons, template matching, abbreviation matching, abbreviation expansion, spelling and/or grammatical corrections, and the like. The matching may be filtered according to know information including, by way of illustration, actual or potential vendor, data arrangement, and the like.

At block 304, the likely token interpretation are combined in various ways, with consideration given to the most likely interpretations of the tokens, to generate a likely product or item identification of the data group/aggregated tokens. For example in regard to FIG. 2, in box 212 the fact that the token "HRML" precedes the token "BLK", and a likely interpretation of "HRML" is the brand name 'Hormel', as well as other information that may or may not be known, and interpretation of the token "BLK" as the word "black" may be considered more likely than the other potential interpretations, the product/item may be identified as "Hormel Black Label Bacon." Similarly, the content "RegPrice" may be interpreted to be "Regular Price" based on the classification of the token, the position of the token with regard to other content, the presence of an apparent price token, "6.99", the location of the price token, and the like. Additionally, while a particular interpretation of one or more tokens may be viewed as "more likely" than other interpretations, for the sake of further processing multiple interpretations may be associated with any given set of tokens or data groups.

At block 306, the likely identifications/interpretations are associated/stored with the regard to the receipt. Additionally, beginning with block 308 and continuing through block 322, these steps are viewed as optional steps with regard to processing the receipt image, not necessary. While they are advantageous in that they may increase the likelihood of correct identification of an item (whether the identification is a product item, a comment or descriptive data, subtotal and total information, vendor information, etc.), they are optional, not mandatory steps of the process.

At block 308, a confidence value is determined, where the confidence value reflects the confidence that the currently iterated aggregated tokens or data group has been correctly identified. The confidence value is an indication of the likelihood that the interpretation of an item of receipt content is correct. According to various non-limiting embodiments, the confidence value may correspond to values within a range, such as between 0.0 and 1.0 where 0.0 represents no confidence and 1.0 represents complete confidence that the product is correctly identified. Alternatively, another range may correspond to numbers between 1 and 100, with 1 as the least confidence and 100 the greatest. Of course, other value ranges or discrete values may be used to represent a confidence score. Additionally, the values of the confidence values are such that they may be compared against predetermined threshold values in order to gauge whether a human evaluator should consider and evaluate the particular potential product item for the corresponding data group.

At decision block 310, a determination is made as to whether the confidence value falls below a confidence threshold. If the confidence value falls below that confidence threshold, at block 312 an evaluation by an evaluator is conducted. The evaluator conducts the evaluation according to a presentation of the various interpretations and aggregations previously associated with the tokens.

Figure 4:
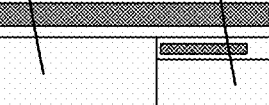
FIG. 4 is a pictorial diagram illustrating an exemplary presentation view in which an evaluator can modify, update, disambiguate, correct, and/or augment information regarding one or more items lines of a corresponding receipt image.

By way of illustration, FIG. 4 is a pictorial diagram illustrating an exemplary presentation view 400 in which an evaluator (a person) can modify, update, disambiguate, correct, and/or augment information regarding one or more items lines of a corresponding receipt image. Indeed, as illustratively shown, the presentation view 400 includes an image view 414 displaying an image of a receipt such that the evaluator can modify the boundaries of the receipt image 202 to correct any automated selection. Also, the presentation view 400 may provide one or more data group tiles, such as data group tiles 402-410, in which the evaluator may examine specific tokens, aggregations of the tokens, potential product item interpretations, and the like, as well as validate any set of product data, such as the product data shown in tiles 404 or 408, as well as vendor data as shown in tile 402, information data, section data as shown in tile 406, and the like. In all of these, the evaluator is able to relate the information in the tile to the content in the image due to the fact that the characters and terms are associated with a particular location within the receipt item 202, which association may be displayed to the evaluator on request. When an evaluator is satisfied with a particular data group or aggregation of tokens, and particular in regard to those interpretations that were viewed as having a low confidence threshold, the evaluator may indicated that the information is validated, e.g., via a validate box 412.

With reference again to FIG. 3, after the evaluation of the evaluator, at block 314 the interpretations of the various items of content are updated and stored according to the determinations of the evaluator.

Even after an evaluator conducts his/her evaluation, or if an evaluator does not evaluate the identified items, one or more items of content (aggregations of tokens or data groups) may need to be clarified. Accordingly, at block 316 another determination is made as to the confidence of the interpretations with regard to one or more identified items of the receipt. Again, at decision block 318, if the determined confidence value falls below a threshold, the routine 300 proceeds to block 320. By way of example, assuming the evaluator was unable to determine whether the vendor information of tile 402 was correctly identified such that confidence for that item remains low, the system may generate a message to the user/purchaser requesting information, such as "Is the vendor for this receipt 'Safeway on Bainbridge Island?'"

At block 320, the process 300 obtains user feedback regarding the various interpretations associated with the receipt, and particularly (or specifically) in regard to the items of low confidence. Correspondingly, at block 322, the interpretations associated with the receipt are updated according to the user feedback, i.e., they are stored with the receipt as well as utilized as feedback to those processes (e.g., those described above in blocks 302 and 304) for improved identification accuracy and confidence. Thereafter, routine 300 terminates.

With regard to routine 300, while this routine illustrates that the evaluation by the evaluator is conducted prior to obtaining user feedback, it should be appreciated that either or both of the supplemental evaluations (by the evaluator and by the user associated with the receipt) may be conducted. Moreover, the order in which the supplemental evaluations are conducted is not mandatory: either may be conducted as a first measure in attempting to improve the confidence regarding the interpretations of the items of content of the receipt image.

Returning to routine 100 of FIG. 1, after having evaluated the receipt content to determine likely interpretations, at block 120 the determined receipt data is stored in conjunction with the receipt image. Additionally and according to aspects of the disclosed subject matter, as various receipt items are associated with a higher level of confidence, or confirmed and/or validated through an evaluator or the user/purchaser, the identified information optionally may cause that one or more filters or steps of routine 100 be repeated. For example, assuming that an evaluator modifies the location of the receipt image 202 relative to the image of the receipt 200. Naturally, this change may cause that the routine 100 return to block 106 for additional processing since the new location may cause changes in the results from the previously conducted steps in the routine/process, including the OCR step, vendor identification, token generation, and/or token interpretation. By way of an additional example, if a vendor is validated, then the process may return to block 110 to re-generate tokens based on information associated with a known vendor. As yet another example, the system may automatically identify that the brightness, contrast, and/or zoom levels of the receipt image may be improved and change these aspects with regard to the receipt image. Of course, these changes may substantially impact how the outcome of the OCR process (block 108), which may cause that all or some of the other steps of the routine 100 require reprocessing. Of course, for that information that has been validated by an evaluator or user, such information may be held irrespective of the reprocessing.

As a further part of evaluating the product data, as information becomes established, e.g., a particular abbreviation is determined for a particular vendor, that information is captured by the process and stored as known information. For example, if the tokens of vendor tile 402 are established as "Safeway," then the particular patter of tokens, "SAFE" "WAV" "(S)", may be stored as a known pattern for future reference with regard to vendors. Of course, the steps of generating tokens, constructing data groups, identifying potential product items for corresponding data groups, evaluating the potential product items for the corresponding data groups, and capturing receipt data for the receipt may each be conducted according to known information of the identified vendor, the data structure and arrangement of the receipt, and the particulars aspects of the receipt image 202.

After the evaluation of receipt content (block 120), the storing of receipt data, and any additional reprocessing (with corresponding evaluations and storage), the routine 100 terminates.

Regarding routines 100 and 300 described above, as well as other processes describe herein, while these routines/processes are expressed in regard to discrete steps, these steps should be viewed as being logical in nature and may or may not correspond to any specific actual and/or discrete steps of a given implementation. Also, the order in which these steps are presented in the various routines and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while these routines include various novel features of the disclosed subject matter, other steps (not listed) may also be carried out in the execution of the subject matter set forth in these routines. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard FIG. 6 below. Additionally, in various embodiments all or some of the various routines may also be embodied in executable hardware modules including, but not limited to, system on chips (SoC's), codecs, specially designed processors and or logic circuits, and the like on a computer system.

As suggested above, these routines/processes are typically embodied within executable code modules comprising routines, functions, looping structures, selectors and switches such as if-then and if-then-else statements, assignments, arithmetic computations, and the like. However, as suggested above, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer-executable instructions stored by computer-readable media, also referred to as computer-readable storage media, which are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed by a processor of a computing device, the execution thereof causes, configures and/or adapts the executing computing device to carry out various steps, methods and/or functionality, including those steps, methods, and routines described above in regard to the various illustrated routines. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. While computer-readable media may reproduce and/or cause to deliver the computer-executable instructions and data to a computing device for execution by one or more processors via various transmission means and mediums, including carrier waves and/or propagated signals, for purposes of this disclosure computer readable media expressly excludes carrier waves and/or propagated signals.

Figure 5:
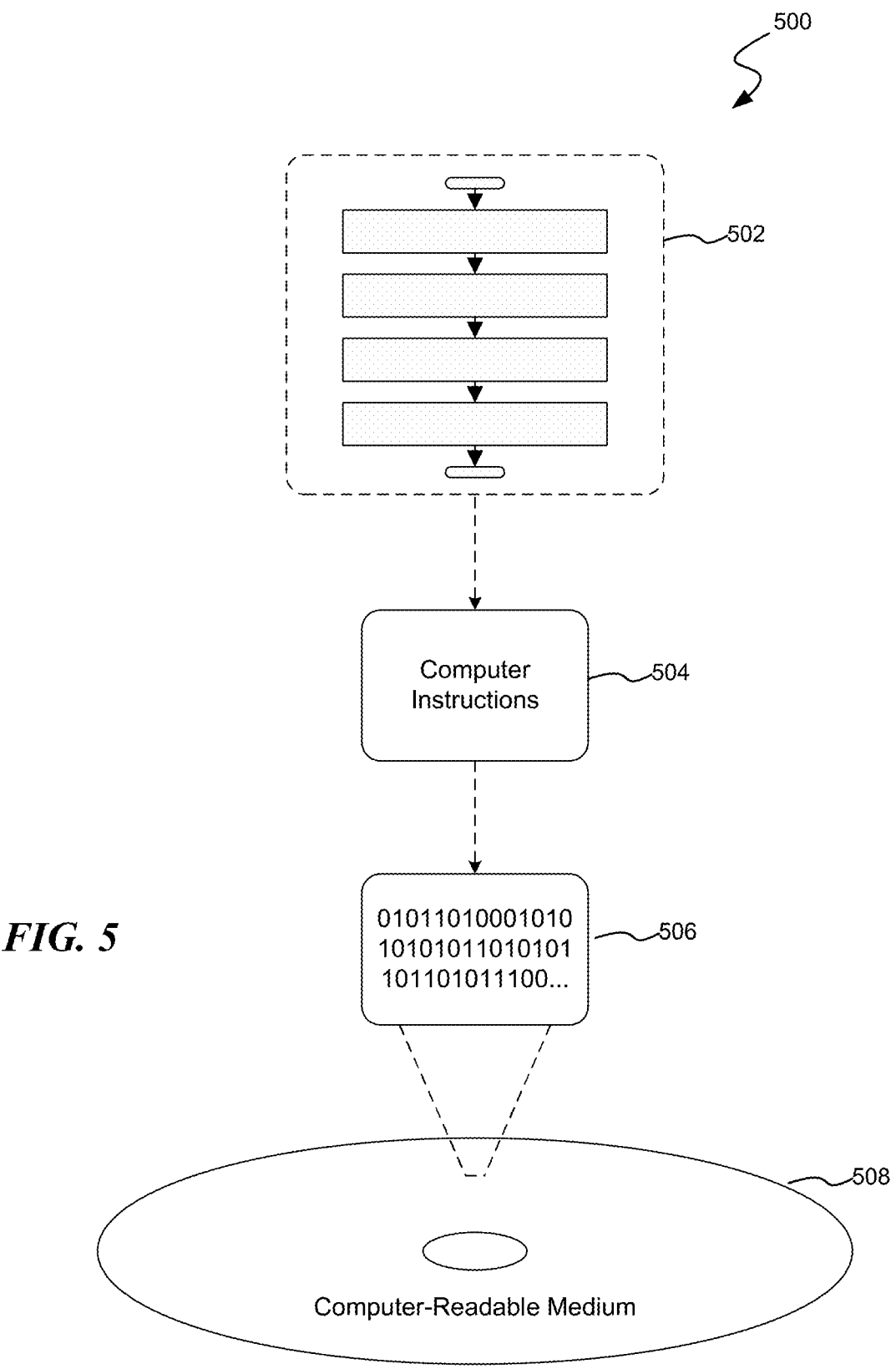
FIG. 5 is a block diagram illustrating an exemplary computer readable medium encoded with instructions to process receipts as described above.

Turning to FIG. 5, FIG. 5 is a block diagram illustrating an exemplary computer readable medium encoded with instructions to process receipts as described above. More particularly, the implementation 500 comprises a computer-readable medium 508 (e.g., a CD-R, DVD-R or a platter of a hard disk drive), on which is encoded computer-readable data 506. This computer-readable data 506 in turn comprises a set of computer instructions 504 configured to operate according to one or more of the principles set forth herein. In one such embodiment, the processor-executable instructions 504 may be configured to perform a method, such as at least some of the exemplary methods 100 and 300, for example. In another such embodiment, the processor-executable instructions 504 may be configured to implement a system, such as at least some of the exemplary system 600, as described below. Many such computer-readable media may be devised, by those of ordinary skill in the art, which are configured to operate in accordance with the techniques presented herein.

Figure 6:
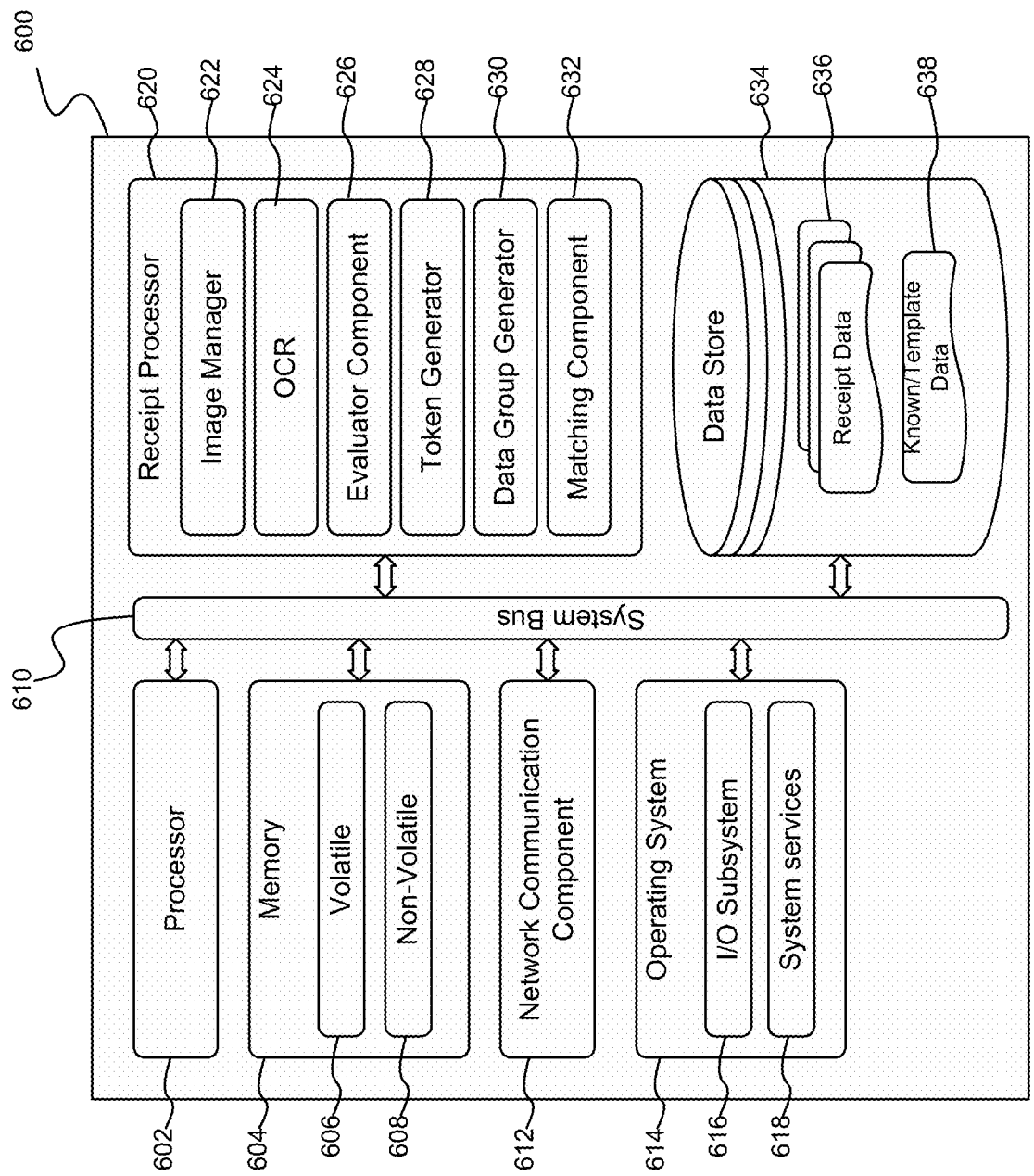
FIG. 6 is a block diagram illustrating an exemplary computing device configured to provide automatic receipt as described herein.

Turning now to FIG. 6, FIG. 6 is a block diagram illustrating an exemplary computing device 600 configured to provide automatic receipt as described herein. The exemplary computing device 600 includes one or more processors (or processing units), such as processor 602, and a memory 604. The processor 602 and memory 604, as well as other components, are interconnected by way of a system bus 610. The memory 604 typically (but not always) comprises both volatile memory 606 and non-volatile memory 608. Volatile memory 606 retains or stores information so long as the memory is supplied with power. In contrast, non-volatile memory 608 is capable of storing (or persisting) information even when a power supply is not available. Generally speaking, RAM and CPU cache memory are examples of volatile memory 606 whereas ROM, solid-state memory devices, memory storage devices, and/or memory cards are examples of non-volatile memory 608.

As will be appreciated by those skilled in the art, the processor 602 executes instructions retrieved from the memory 604 (and/or from computer-readable media, such as computer-readable media 500 of FIG. 5) in carrying out various functions of automated receipt processing as described above. The processor 602 may be comprised of any of a number of available processors such as single-processor, multi-processor, single-core units, and multi-core units.

Further still, the illustrated computing device 600 includes a network communication component 612 for interconnecting this computing device with other devices and/or services over a computer network. The network communication component 612, sometimes referred to as a network interface card or NIC, communicates over a network using one or more communication protocols via a physical/tangible (e.g., wired, optical, etc.) connection, a wireless connection, or both. As will be readily appreciated by those skilled in the art, a network communication component, such as network communication component 612, is typically comprised of hardware and/or firmware components (and may also include or comprise executable software components) that transmit and receive digital and/or analog signals over a transmission medium (i.e., the network.)

The exemplary user computing device 600 also includes an operating system 614 that provides functionality and services on the user computing device. These services include an I/O subsystem 616 that comprises a set of hardware, software, and/or firmware components that enable or facilitate inter-communication between a user of the computing device 900 and the processing system of the computing device 900. Indeed, via the I/O subsystem 614 a computer operator may provide input via one or more input channels such as, by way of illustration and not limitation, touch screen/haptic input devices, buttons, pointing devices, audio input, optical input, accelerometers, and the like. Output or presentation of information may be made by way of one or more display screens (that may or may not be touch-sensitive), speakers, haptic feedback, and the like. As will be readily appreciated, the interaction between the computer user and the computing device 600 is enabled via the I/O subsystem 614 of the user computing device. Additionally, system services 618 provide additional functionality including location services, timers, interfaces with other system components such as the network communication component 612, and the like.

The exemplary computing device 600 also includes various executable components, which may be implemented as software components that configure the computing device to operate in processing receipts, as executable hard components, or a combination of hardware and software components. Included in these components is a receipt processor 620 that obtains an image of a receipt 200, executes one or more filters/processes to identify receipt data of the receipt, and capture data from the receipt. These filters include an image manager 622 that, in execution, identifies a receipt image 202 within an image of a receipt, as described above in regard to block 104 of FIG. 1.

Another executable component is the OCR component 624. As suggested above, the OCR component, in execution, causes the textual content of the receipt, as embodiment in the receipt image, to be transcribed to machine encoded textual content. The Evaluator Component 626, in execution, carries out the function of presenting the identified/interpreted results to an evaluator for editing, modification, and/or validation as set forth above in regard to block 312 of FIG. 3 and presentation view 400 of FIG. 4.

The Token Generator 628, in execution, carries out the function of generating tokens from the various characters transcribed from the OCR component 626. As discussed above in regard to block 110, a token corresponds to one or more contiguous text characters (as defined above). Additionally, the Token Generator 628 also optionally classifies the generated tokens according to one of a plurality of token classifications, as described above in regard to block 112 of FIG. 1.

The Data Group Generator 630, in execution, operates to identify data groups within the receipt image according to the tokens identified by the tokenizer 628. The Matching Component 632, in execution, carries out the matching of tokens and sets of tokens to known products, vendors, descriptive text and the like as set forth in regard to routine 300 of FIG. 3.

The data store 634 stores receipt data/information regarding various receipts from multiple vendors, and further stored known data regarding vendors, abbreviations, data arrangement/structures, and the like.

In operation, the receipt processor 620, in conjunction with the various filters and processors, operates to carry out the functions described above in regard to routines 100 and 300 of FIGS. 1 and 3, particularly in regard to automated processing of receipts.

Regarding the various components of the exemplary computing devices 600, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including executable software modules that carry out one or more logical elements of the processes described in this document, or as a hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented method for processing a receipt, the method comprising:
   receiving an image of a receipt;
   executing an optical character recognition (OCR) of the receipt content embodied in the image, wherein executing the OCR of the receipt content results in machine-encoded text content;
   generating tokens from the machine-encoded text content;
   aggregating the generated tokens into a plurality of data groups, wherein at least one data group of the plurality of data groups comprises a plurality of generated tokens; and
   for each data group of the plurality of data groups:
      identifying likely interpretations of the tokens of the data group;

identifying a plurality of likely products for the data group according to the likely interpretations of the tokens of the data group, wherein each likely product of the plurality of likely products is associated with a confidence value indicative of a likelihood that the likely product is a correct interpretation of the corresponding information of the receipt image;

determining whether the confidence scores associated with the plurality of likely products fall below a confidence threshold, and if the confidence scores fall below the confidence threshold:

providing the plurality of likely products to an evaluator;

obtaining feedback from the evaluator regarding the plurality of likely products; and updating the confidence values associated with the plurality of likely products according to the obtained feedback; and storing the plurality of likely products of the data group in association with the image of the receipt in a data store.

2. The computer implemented method of claim 1, further comprising, for each generated token:

classifying the token with a token classification as to what the token likely represents;

wherein identifying the plurality of likely products for the data group comprises identifying the plurality of likely products for the data group according to the token classifications of the aggregated tokens of the data group.

3. The computer implemented method of claim 2, wherein generating tokens from the machine-encoded text content comprises:

identifying a vendor corresponding to the receipt; and generating tokens from the machine encoded text content according to known information corresponding to the identified vendor.

4. The computer implemented method of claim 3, further comprising identifying a receipt image, the receipt image corresponding to a sub-image of the received image of the receipt that includes only content of the receipt.

5. The computer implemented method of claim 4, wherein executing the OCR of the receipt content embodied in the image comprises executing the OCR of content in the receipt image.

6. The computer implemented method of claim 5, wherein at least one data group of the plurality of data groups comprises tokens aggregated from a plurality of horizontal lines of the machine-encoded text content.

7. The computer implemented method of claim 6, wherein classifying the token with a token classification as to what the token likely represents comprises classifying the token with a token classification in view of known information of the identified vendor.

8. The computer implemented method of claim 7, wherein the steps of generating tokens, aggregating the generated tokens into a plurality of data groups, identifying likely interpretations of the tokens, identifying the plurality of likely products for each data group, and storing the plurality of likely products of the data group in association with the image of the receipt in a data store are conducted according to known information of the identified vendor.

9. The computer implemented method of claim 7, further comprising, upon identifying a vendor of the receipt, re-executing the steps of executing the OCR of the receipt content, generating the tokens, aggregating the generated tokens into a plurality of data groups, identifying likely interpretations of the tokens, and identifying the plurality of likely products for each data group according to known information of the identified vendor.

10. A non-transitory computer readable medium bearing computer executable instructions which, when executed on a computing system comprising at least a processor retrieved from the medium, carry out a method for processing a receipt, the method comprising:

receiving an image of a receipt;

executing an optical character recognition (OCR) of the receipt content embodied in the image, wherein executing the OCR of the receipt content results in machine-encoded text content;

generating tokens from the machine-encoded text content;

aggregating the generated tokens into a plurality of data groups; and for each data group of the plurality of data groups:

identifying likely interpretations of the tokens of the data group;

identifying a plurality of likely products for the data group according to the likely interpretations of the tokens of the data group, wherein each likely product of the plurality of likely products is associated with a confidence value indicative of a likelihood that the likely product is a correct interpretation of the corresponding information of the receipt image;

determining whether the confidence scores associated with the plurality of likely products fall below a confidence threshold, and if the confidence scores fall below the confidence threshold:

providing the plurality of likely products to an evaluator;

obtaining feedback from the evaluator regarding the plurality of likely products; and updating the confidence values associated with the plurality of likely products according to the obtained feedback; and storing the plurality of likely products of the data group in association with the image of the receipt in a data store.

11. The non-transitory computer readable medium of claim 10, wherein generating tokens from the machine-encoded text content comprises generating tokens from the machine encoded text content according to known information corresponding to the identified vendor.

12. The non-transitory computer readable medium of claim 11, wherein the method further comprises further comprising identifying a receipt image, the receipt image corresponding a sub-image of the received image of the receipt that includes only content of the receipt.

13. The non-transitory computer readable medium of claim 12, wherein executing the OCR of the receipt content embodied in the image comprises executing the OCR of content in the receipt image.

14. The non-transitory computer readable medium of claim 13, wherein the method further comprises, for each generated token:

classifying the generated token with a token classification;

wherein identifying likely interpretations of the tokens of the data group comprises identifying likely interpretations of the tokens of the data group according to the token classifications of the aggregated tokens of the data group.

15. The non-transitory computer readable medium of claim 14, wherein classifying each generated token with a token classification comprises classifying each generated token with a token classification in view of known information of the identified vendor.

16. The non-transitory computer readable medium of claim 15, wherein the steps of generating tokens, aggregating the generated tokens into a plurality of data groups, identifying likely interpretations of the tokens, identifying the plurality of likely products for each data group, and storing the plurality of likely products of each data group in association with the image of the receipt in a data store are conducted according to known information of the identified vendor.

17. The non-transitory computer readable medium of claim 15, wherein the method further comprises, upon identifying a vendor of the receipt, re-executing the steps of executing the OCR of the receipt content, generating the tokens, aggregating the generated tokens into a plurality of data groups, identifying likely interpretations of the tokens, and identifying the plurality of likely products for each data group according to known information of the identified vendor.

18. A computer device for processing a receipt, the computer device comprising a processor and a memory, wherein the processor executes instructions stored in the memory as part of or in conjunction with additional components to process the receipt, the additional components comprising:
   a receipt processor that, in execution and in conjunction with additional components:
      receives an image of a receipt;
      captures receipt data from the receipt; and
      stores the captured receipt data in a data store in conjunction with the receipt;
   an Optical Character Recognition (OCR) component, wherein in execution the OCR component transcribes the receipt content embodied in the image of the receipt into machine-encoded text content;
   a token generator that, in execution, generates tokens from the machine-encoded text content such that each item of the machine-encoded text content is encapsulated in a generated token of the generated tokens;
   a data group generator that, in execution, constructs data groups according aggregations of horizontal lines of tokens of the receipt; and
   a matching component that, in execution and for each data group:
      identifies likely interpretations of the tokens of the data group;
      identifies a plurality of likely products for the data group according to the likely interpretations of the tokens of the data group; and
      stores the plurality of likely products for the data group in association with the image of the receipt in a data store.

19. The computer device of claim 18, wherein the matching component, in execution and for each data group, is further configured to associate a confidence value to each likely product of the plurality of likely products, each confidence value indicative of a likelihood that the likely product is a correct interpretation of the corresponding information of the receipt image.

20. The computer device of claim 19, wherein the matching component, in execution and for each data group, is further configured to:
   determine whether the confidence scores associated with the plurality of likely products fall below a confidence threshold, and if the confidence scores fall below the confidence threshold:
      providing the plurality of likely products to an evaluator;
      obtaining feedback from the evaluator regarding the plurality of likely products; and
      updating the confidence values associated with the plurality of likely products according to the obtained feedback.

* * * * *